H. G. Fuhrmann,
Faucet Attachment.
N° 80,469. Patented July 28, 1868.

Witnesses:
E. F. Kastenhuber
Chas. Wahlers

Inventor:
H. G. Fuhrmann
By VanSanturro & Hauff
his attys

United States Patent Office.

HENRY G. FUHRMANN, OF BROOKLYN, E. D., NEW YORK.

*Letters Patent No. 80,469, dated July 28, 1868.*

ADJUSTABLE FILTER FOR FAUCETS.

*The Schedule referred to in these Letters Patent and making part of the same.*

TO ALL WHOM IT MAY CONCERN:

Be it known that I, HENRY G. FUHRMANN, of Brooklyn, E. D., in the county of Kings, and State of New York, have invented a new and improved Straining-Attachment to Faucets; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
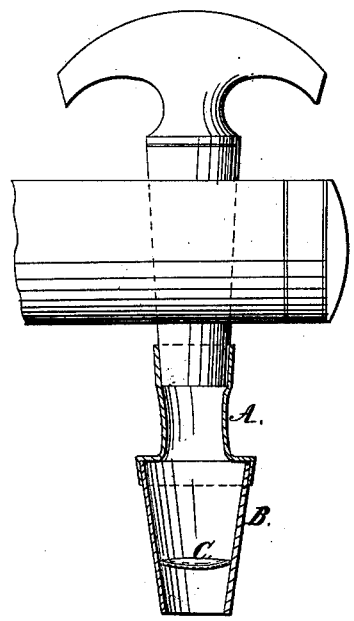
Figure 1 represents a central section of this invention when applied to a faucet.
Figure 2:
Figure 2 is a side elevation thereof.

This invention consists in a straining-attachment, composed of an expansible tube, one end of which is stretched over the end of a conical spout containing the strainer, while its other end is ready to be stretched over the nozzle or mouth-piece of a common faucet in such a manner that a cheap strainer is obtained, which can be readily and conveniently attached to faucets without regard to the size of the mouth-piece.

A represents an elastic tube, of India rubber or other suitable elastic material. One end of this tube is stretched over the large end of the conical spout B, in the interior of which is the strainer C. The spout B is made conical, so that the tube A will take a firm hold on its end, and, furthermore, the thin end of said spout can be readily introduced into bottles or other vessels.

If the strainer is to be used, the lower end of the tube A is stretched over the nozzle of the faucet from which water or other liquid is to be drawn, and by the strainer all impurities contained in the water or other liquid are retained.

By using the elastic tube A as the means for connecting the spout B with the nozzle of the faucet, I am enabled to attach said spout to faucets with nozzles of various thicknesses, and the operation of connecting and disconnecting my spout can be effected without trouble or loss of time.

My straining-attachment is very cheap, it is within reach of the poor as well as the rich, and it can be readily used on all faucets from which water or other liquids are drawn.

Having thus described my invention, what I claim as new, and desire to secure by Letters Patent, is—

A straining-attachment to faucets, consisting of an elastic tube A and conical spout B containing a strainer, C, as a new article of manufacture.

HENRY G. FUHRMANN.

Witnesses:
W. HAUFF,
E. F. KASTENHUBER.